(12) United States Patent
Albrechtsen et al.

(10) Patent No.: US 11,549,848 B2
(45) Date of Patent: Jan. 10, 2023

(54) NANOELECTROMECHANICAL INTERFEROMETER FOR VISIBLE TO INFRARED WAVELENGTHS

(71) Applicant: Danmarks Tekniske Universitet, Kongens Lyngby (DK)

(72) Inventors: Marcus Albrechtsen, Kgs. Lyngby (DK); Babak Vosoughi Lahijani, Kgs. Lyngby (DK); Søren Stobbe, Kgs. Lyngby (DK); Konstantinos Tsoukalas, Kgs. Lyngby (DK)

(73) Assignee: DANMARKS TEKNISKE UNIVERSITET, Kongens Lyngby (DK)

( * ) Notice: Subject to any disclaimer, the term of this patent is extended or adjusted under 35 U.S.C. 154(b) by 0 days.

(21) Appl. No.: 17/747,159

(22) Filed: May 18, 2022

(65) Prior Publication Data
US 2022/0349751 A1 Nov. 3, 2022

Related U.S. Application Data

(63) Continuation of application No. PCT/EP2020/082554, filed on Nov. 18, 2020.

(30) Foreign Application Priority Data

Nov. 18, 2019 (EP) .................................. 19209783

(51) Int. Cl.
*G01J 3/02* (2006.01)
*G02F 1/225* (2006.01)
*G01J 3/453* (2006.01)

(52) U.S. Cl.
CPC ........... *G01J 3/0237* (2013.01); *G01J 3/0205* (2013.01); *G01J 3/0256* (2013.01); *G01J 3/0294* (2013.01); *G01J 3/4532* (2013.01); *G02F 1/225* (2013.01)

(58) Field of Classification Search
CPC ...... G01J 3/0237; G01J 3/0205; G01J 3/0256; G01J 3/0294; G01J 3/4532; G02F 1/225
See application file for complete search history.

(56) References Cited

U.S. PATENT DOCUMENTS 7,519,257 B2   4/2009  Lipson et al.
7,970,241 B2   6/2011  Chen et al.
(Continued)

FOREIGN PATENT DOCUMENTS

CN    102207459 A    10/2011
WO   2010/099104 A2    9/2010
(Continued)

OTHER PUBLICATIONS

Chen, Chen, Xun Hou, and Jinhai Si. "Protein analysis by Mach-Zehnder interferometers with a hybrid plasmonic waveguide with nano-slots." Optics Express 25.25 (2017): 31294-31308. (Year: 2017).*

(Continued)

*Primary Examiner* — Shawn Decenzo
(74) *Attorney, Agent, or Firm* — Dinsmore & Shohl LLP

(57) ABSTRACT

An on-chip interferometer and a spectrometer including the interferometer are provided. An on-chip interferometer includes a waveguide for propagation of an optical signal including an input waveguide; at least two interferometer arms having one or more slot waveguides; and an output waveguide; wherein the input waveguide is split into the at least two interferometer arms which are recombined into the output waveguide; and a control mechanism configured for controlling a relative time delay between optical signals propagating in the two interferometer arms by modifying one or more slot widths of one or more of the slot waveguides; and wherein the relative time delay is at least 1, 2, (Continued)

5, or at least 10 fs or at least one optical period of the longest optical wavelength of the optical signal.

21 Claims, 8 Drawing Sheets

(56) References Cited

U.S. PATENT DOCUMENTS

| | | | |
|---|---|---|---|
| 8,380,016 B1* | 2/2013 | Hochberg | G02F 1/2257 385/40 |
| 8,818,141 B1* | 8/2014 | Hochberg | H04B 10/505 385/2 |
| 2021/0318490 A1* | 10/2021 | Peng | H01S 5/005 |
| 2022/0137295 A1* | 5/2022 | Grillanda | G02B 6/12028 385/131 |

FOREIGN PATENT DOCUMENTS

| | | |
|---|---|---|
| WO | 2012/015995 A2 | 2/2012 |
| WO | 2017/201548 A1 | 11/2017 |
| WO | 2019/126786 A1 | 6/2019 |
| WO | 2020161041 A1 | 8/2020 |

OTHER PUBLICATIONS

"Ultra-small silicon waveguide coupler switch using gap-variable mechanism" in Optics Express, vol. 19, Issue 24, 2011, pp. 23658-23663.

"Investigation on an ultra-compact Mach-Zehnder interferometer electro-optic switch using poled-polymer/silicon slot waveguide" in Optical and Quantum Electronics, Aug. 14, 2015, vol. 47. No. 12, pp. 3783-3803.

"Ultracompact Phase Modulator Based on a Cascade of NEMS-Operated Slot Waveguides Fabricated in Silicon-on-Insulator" in IEEE Photonics Journal, Jun. 1, 2012, vol. 4, No. 3, pp. 779-788.

* cited by examiner

NANOELECTROMECHANICAL INTERFEROMETER FOR VISIBLE TO INFRARED WAVELENGTHS

CROSS-REFERENCE TO RELATED APPLICATIONS

This application is a continuation of International Patent Application No. PCT/EP2020/082554 filed on Nov. 18, 2020 and designating the United States of America and which claims priority to European Patent Application 19209783.0 filed on Nov. 18, 2019, the entire content of both are incorporated herein by reference in their entirety.

FIELD OF THE INVENTION

The present disclosure relates to an on-chip interferometer and a spectrometer comprising said interferometer.

BACKGROUND OF INVENTION

An optical spectrometer is an instrument capable of measuring the wavelength-dependent intensity of light over a range of the electromagnetic spectrum. A common type of spectrometer is the Fourier-transform spectrometer. These are typically based on interferometers, such as a Mach-Zehnder interferometer, wherein the optical signal is split up into two separate paths, and the optical signal of one path is delayed due to different path lengths, before combining the optical signals resulting in an interference. The light intensity for each wavelength may be obtained by performing a Fourier Transform (FT) on the measured data (light intensity at each time delay).

Key figures of merit of a spectrometer are its bandwidth (the spectrum it can measure) and resolution (the ability to quality of the measurement). The target bandwidth and resolution dictate the required time-delay step size in the interferometer, i.e. the minimum change in the relative path lengths of the split optical signals that can be applied and detected.

The current state of the art in commercially available spectrometers is based on either gratings or bulk interferometers combined with a photodetector and they often contain big, movable mechanical components. Broadband and high-resolution optical spectrometers have been shown but, while they provide excellent specifications, they are neither affordable nor suited to be moved around, i.e. they are not portable, due to their bulkiness and weight. While smaller spectrometers have been shown, they suffer from limited spectral resolution. The limited spectral resolution makes them unsuitable for a wide range of applications such as optical interrogators. Even though the spectral resolution of these devices would improve, they are still too bulky for integration, e.g., as health monitoring sensors in future smartphones.

Van Acoleyen, K. et al. Ultracompact Phase Modulator Based on a Cascade of NEMS-Operated Slot Waveguides Fabricated in Silicon-on-Insulator. *IEEE Photonics J.* 4, 779-788 (2012) discloses a phase modulator based on a cascade of three 5.8 μm long nano-electro-mechanical operated slot waveguides, wherein a voltage is applied over a freestanding slot waveguide to change the slot width, resulting in an effective index change and thus a phase change. Using a cascaded structure, the effect can be enlarged without reducing the speed. A phase change of 40° is observed over a cascade of three freestanding slots. Hence, this NEMS based phase modulator operating on slot waveguide achieves a phase shift of only 40°.

Huang, X.-L. et al. Investigation on an ultra-compact Mach-Zehnder interferometer electro-optic switch using poled-polymer/silicon slot waveguide. *Opt Quant Electron* 47, 3783-3803 (2015) discloses a Mach-Zehnder switch operated at 1550 nm utilizing a slot waveguide embedded in a poled-polymer material and utilizing the electro-optic effect for index modulation to achieve a π/2 phase shift by means of a 350 μm long Mach-Zehnder region with a 100 nm slot width.

SUMMARY OF THE INVENTION

The present inventors have realized that there is a significant need for small and affordable spectrometers that have a high spectral resolution. Surprisingly, the present inventors have discovered how this can be realized by the use of a tunable chip-scale interferometer based on slot waveguides and wherein a much longer time delay can be induced in the interferometer by adequately controlling the slot waveguides, for example by employing suspended slot waveguides. The longer time delay provides for the high spectral resolution. A slot waveguide is an optical waveguide that guides confined light in a subwavelength-scale low-refractive-index region.

The present disclosure therefore relates to an on-chip interferometer comprising;

a waveguide for propagation of an optical signal comprising
a. an input waveguide;
b. at least two interferometer arms comprising one or more slot waveguides; and
c. an output waveguide;

wherein the input waveguide is split into the at least two interferometer arms which are recombined into the output waveguide; and a control mechanism configured for controlling a relative time delay between optical signals propagating in the two interferometer arms by modifying one or more slot widths of one or more of the slot waveguides; and wherein the relative time delay is at least 1, 2, 5, or at least 10 fs or at least one optical period of the longest optical wavelength of the optical signal.

Interferometers may be passive devices designed for analysis of specific wavelengths of interest of time constant signals, and they are consequently designed to introduce specific time delays, wherein the time delay is relative to the wavelength of interest. Instead, the interferometer of the present disclosure may be configured to introduce time delays to an optical signal of at least 1 fs, or more preferably at least 2 fs, even more preferably at least 5 fs, or most preferably at least 10 fs. Hence, possibly a relative time delay of several times larger than the time delay of the highest frequency component of the optical signal, such as at least 1, more preferably at least 2, even more preferably at least 5, or most preferably at least 10 or more optical periods of the longest optical wavelength of the optical signal having a spectral range. A relative time delay of 1 fs is much larger than a phase shift on the order of π/2 and much more efficient than requiring a 350 μm long Mach-Zehnder region with a 100 nm slot width.

The on-chip interferometer may rely on providing correct voltages to specific parts of said device, for example to the control mechanism. Complicated, out-of-plane solutions have been proposed in the prior art that allow for application of voltages to electrically isolated parts of a chip-based device. Contrary to this, PCT/EP2020/082545 discloses an efficient in-plane solution for voltage control of specific isolated parts of a chip-based device. Certain embodiments of the presently disclosed interferometer may therefore benefit from the disclosure of this document.

Given the typical frequencies of optical signals, a detector typically measures the intensity of the rejoined optical signal accumulated over many optical periods. A Fourier Transform (FT) of the measured signal produces the intensity of each frequency component present in the signal with a resolution that scales with wavelength, and critically, inversely with the maximum time delay.

Consequently, the interferometer of the present disclosure ensures a high resolution (frequency resolution), due to being configured for introducing relative time delays between the optical signals of the arms many times higher than the highest frequency components of the optical signal.

Preferably the interferometer is provided in a configuration that allows for the use of a single detector, combined with a tunability of the relative time delay between the optical signals propagating in the arms of the interferometer. This may allow for significantly more compact and/or affordable Fourier-transform spectrometers than presently available.

Furthermore, the present interferometer may be operable over a large bandwidth, including the visible to the infrared spectrum, covering for example the fingerprint region (5-9 µm), which is important for applications in medtech, healthcare, biosciences, for production, and more. The large bandwidth may in-part be attributed to the use of slot waveguides, as they are, to a large degree, wavelength agnostic.

Preferably, the control mechanism is configured to control a relative time delay of the optical signals in one or more interferometer arms. The control mechanism may thereby be configured to introduce a relative time delay between the optical signals propagating in the one or more interferometer arms, before rejoining the optical signals in an output waveguide.

Preferably the control mechanism is configured to induce the relative time delay to the optical signal by modifying one or more slot widths of one or more slot waveguides. The slot width is given by the distance between the two strips of high refractive index materials, of the slot waveguide. Depending on the compression of the photonic slot mode, by varying the distance between said strips, the resulting effective mode index may be modified, to modify the propagation speed of light in the slot. Consequently, a relative time delay between the optical signals propagating in the at least two arms of the interferometer may be introduced by modifying the slot width of said arms. Thereby, the relative time delay is not necessarily introduced by differences in physical path length between the arms of the interferometer, although this may additionally be a contributing factor to the relative time delay.

Therefore, the control mechanism may comprise one or more electrically controlled actuators for modifying the slot widths. The slot width may be static in one of the arms of the interferometer while a second arm may be tuned by said actuators, for introducing a relative time delay between the optical signals of the arms. The electrically controlled actuators may be any type of actuator providing control of the slot width. For example, the actuator may be a nanoelectromechanical (NEMS) actuator, such as a NEMS comb drive. The control mechanism may be configured to control one or more slot widths by electrostatic forces, for example by controlling the electrostatic forces between two electrically conductive combs.

The present disclosure further relates to a Fourier transform spectrometer comprising: an on-chip interferometer as disclosed elsewhere herein; a detector configured for measuring the recombined optical signal; and a processing unit configured for spectral analysis of the measured recombined optical signal.

An integrated circuit (IC) is a complete circuit or group of circuits manufactured with planar technology using semiconductor materials, such as silicon, such as silicon-on-insulator. Hence, an integrated circuit or quasi-monolithic integrated circuit can also be referred to as an IC, a chip, or a microchip, or planar IC, or chip-scale device. A monolithic circuit is a complete circuit or group of circuits where all components are manufactured into or on top of a single chip of semiconductor materials, such as silicon, such as silicon-on-insulator. Hence, a monolithic circuit is not necessarily a planar circuit. The presently disclosed on-chip interferometer and/or Fourier transform spectrometer is preferably suitable for integration in an integrated circuit, monolithic and/or planar, such that standard CMOS technology can, at least partly, be utilized.

DETAILED DESCRIPTION OF THE DRAWINGS

Figure 7:
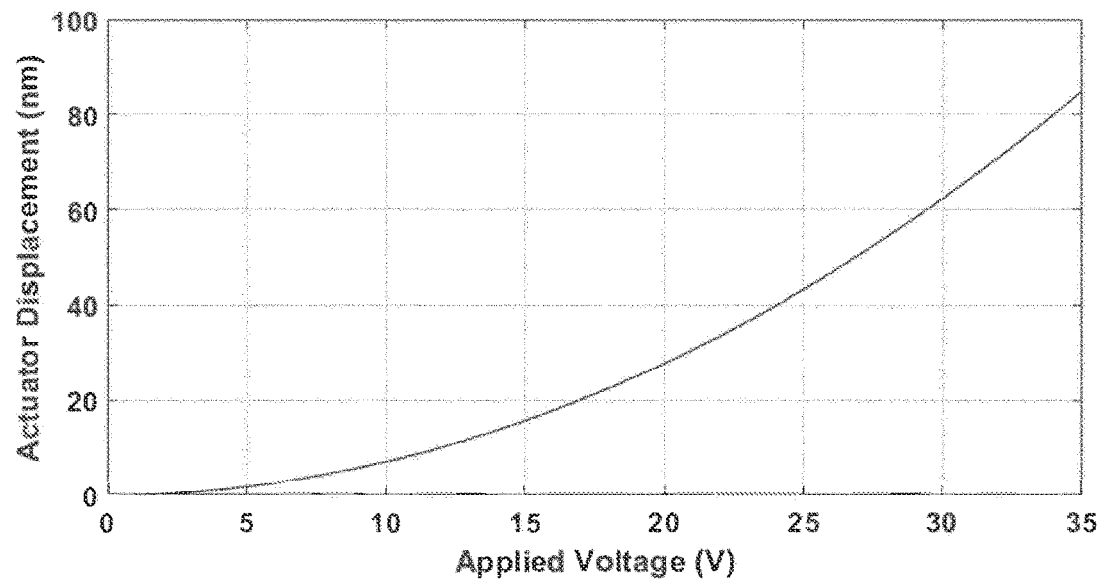
Figure 8:
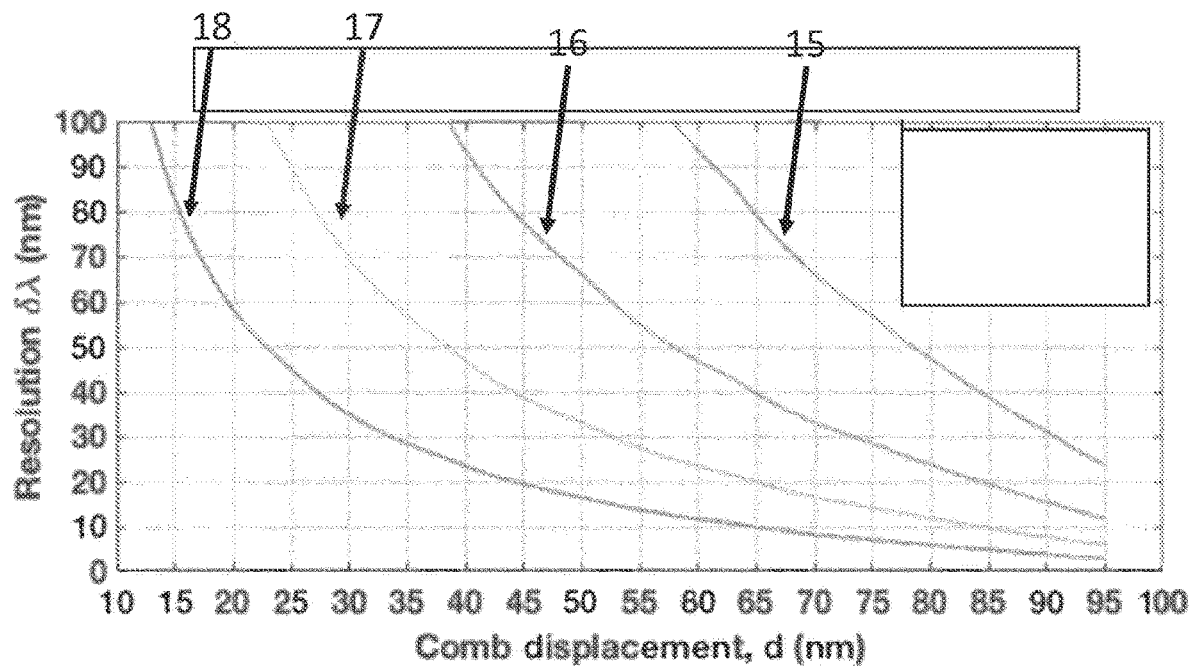
Figure 9:
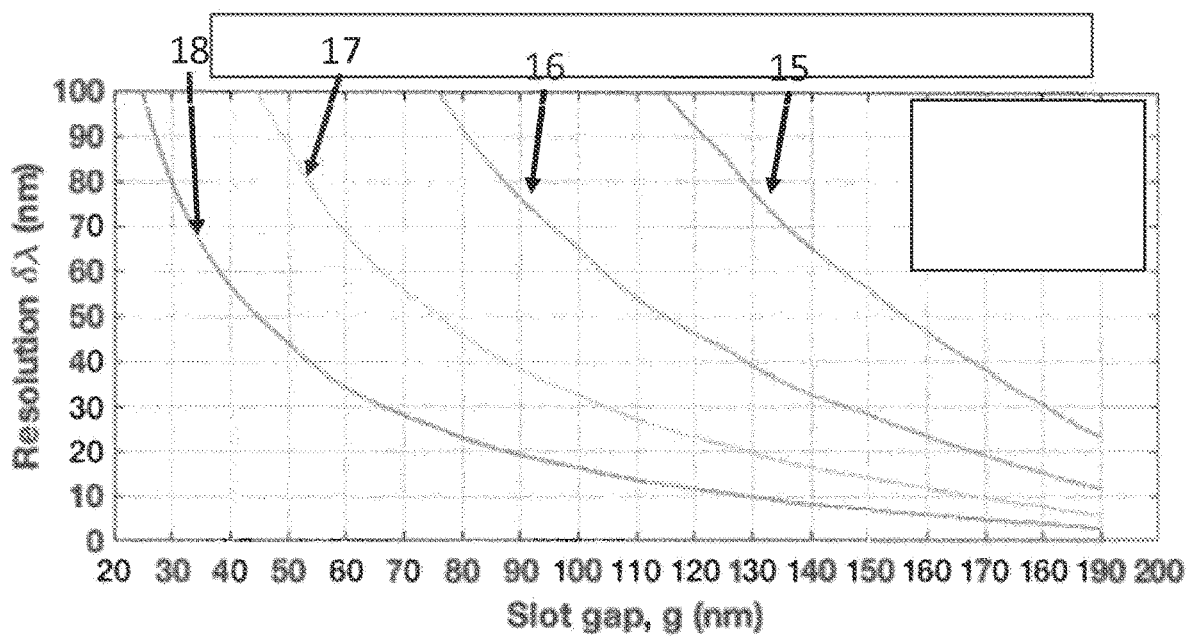
Figure 10:
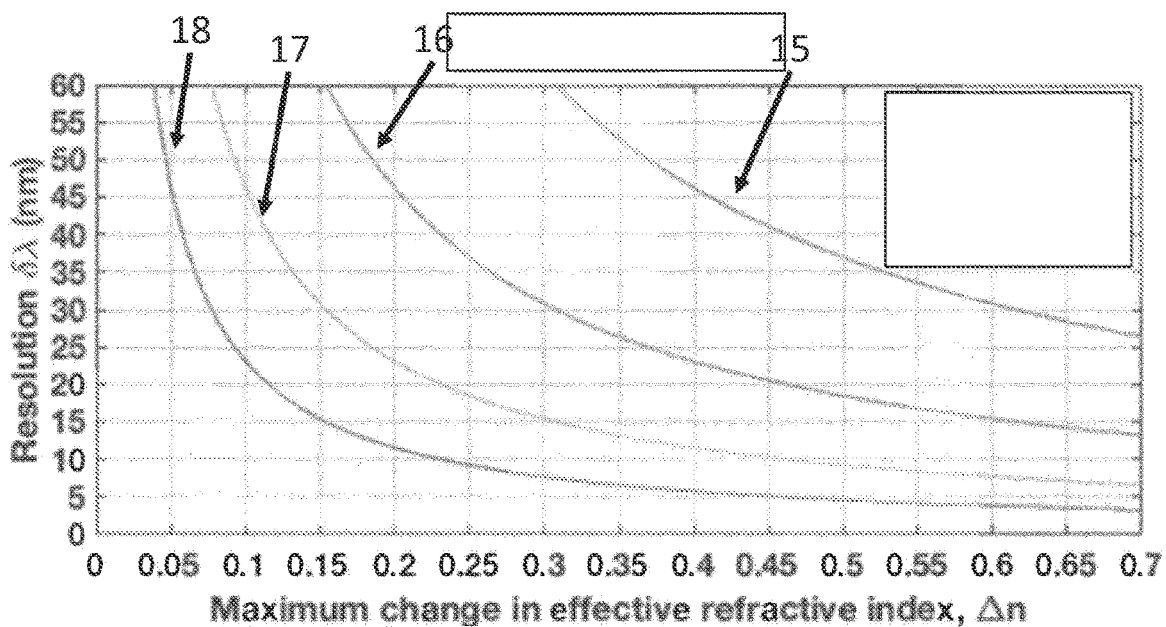
Figure 11A:
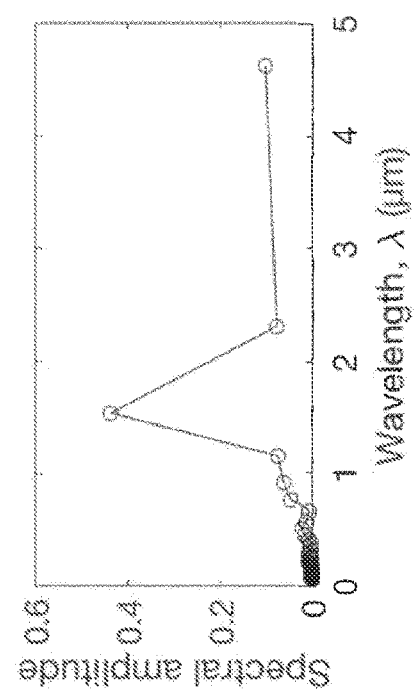
Figure 11B:
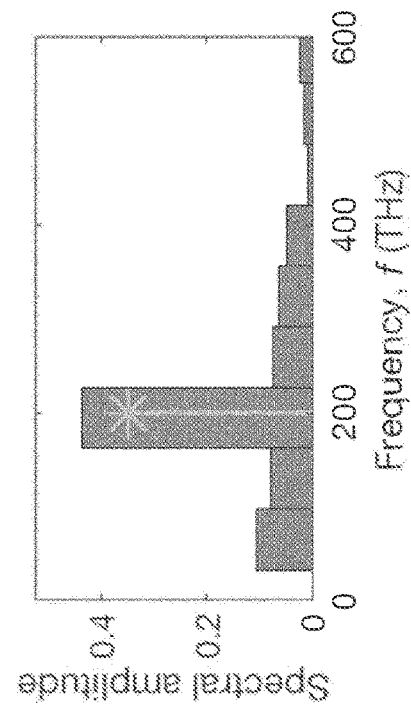
Figure 11C:
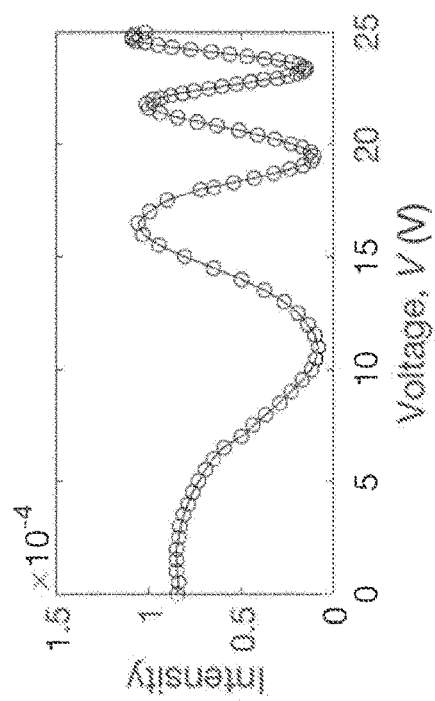
Figure 11D:
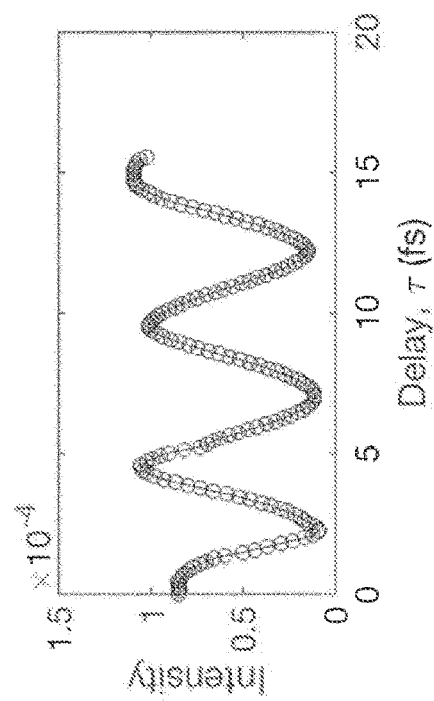

FIG. 6A-D show scanning electron micrographs of a Mach-Zehnder interferometer actuated by a nanoelectromechanical comb drive;

FIG. 7 shows calculated values of displacement of the comb drive actuators of one arm of an active Mach-Zehnder interferometer as the function of the applied voltage to said comb drive actuator;

FIG. 8 shows the calculated resolution of a spectrometer comprising an on-chip interferometer, as a function of the comb drive actuator displacement;

FIG. 9 shows the calculated resolution of a spectrometer comprising an on-chip interferometer, as a function of change to the slot width (slot gap);

FIG. 10 shows the calculated resolution of a spectrometer comprising an on-chip interferometer, as a function of the maximum change in effective refractive index; and FIGS. 11A-D show experimental data for an interferometer according to an embodiment of the present disclosure.

DETAILED DESCRIPTION OF THE INVENTION

The present disclosure relates to an on-chip interferometer comprising; a waveguide for propagation of an optical signal comprising an input waveguide; at least two interferometer arms comprising one or more slot waveguides; and an output waveguide; wherein the input waveguide is split into the at least two interferometer arms which are recombined into the output waveguide; and a control mechanism configured for controlling a relative time delay between optical signals propagating in the two interferometer arms by modifying one or more slot widths, such as the distance between the parallel strips of a slot waveguide, of one or more of the slot waveguides.

A slot waveguide is an optical waveguide that guides strongly confined light in a subwavelength-scale low-refractive-index region. It typically consists of two strips or slabs of high-refractive-index materials separated by a subwavelength-scale low-refractive-index slot region and surrounded by low-refractive-index cladding materials. Slot waveguides may be provided on a substrate or as suspended structures. Slot waveguides are exemplified in U.S. Pat. No. 7,519,257, wherein a high-index-contrast waveguide structure material, used to guide light through a low-refractive-index material, is described.

In an embodiment of the present disclosure, the on-chip interferometer comprises one or more interferometer arms comprising slot waveguides and an associated control mechanism for controlling the slot waveguides, e.g. by controlling a relative time delay between optical signals propagating in the two interferometer arms, for example by modifying one or more slot widths. One embodiment of the on-chip interferometer comprises a waveguide for propagation of an optical signal comprising at least two interferometer arms comprising one or more slot waveguides. At least one input waveguide and/or at least one output waveguide may also be provided. The input waveguides may be split into the two interferometer arms which are recombined into the output waveguide. A control mechanism is advantageously configured for controlling a relative time delay between optical signals propagating in the two interferometer arms, e.g. by modifying one or more slot widths, i.e. the distance between the parallel strips of a slot waveguide, of one or more of the slot waveguides.

Typically, interferometers are designed for analysis of specific wavelengths of interest. Therefore, they are often designed to introduce specific phase shifts, relative to the wavelengths of interest, between the optical signals of the arms. Contrary, the interferometer of the present disclosure may introduce a relative time delay, between the optical signals of the arms, wherein the time delay is typically many times higher than the highest frequency components of the optical signal. In that regard a time delay is uniquely defined, whereas a phase shift only has physical meaning modulo a constant of propagation.

This is important as when a signal, either one wavelength or a broad spectrum, with time-dependent intensity $S(t)$ is delayed a relative time T and interfered, the intensity $I(\tau)$ integrated over many periods directly corresponds to measuring $S(t)$ with $t=\tau$. A Fourier Transform (FT) of a measured signal in such a spectrometer $S(t)=I(\tau)$ produces the intensity of each frequency component present in the signal $I(f)$ with a resolution that scales with wavelength, and critically, inversely with the maximum time delay, $\Delta\tau$ (bandwidth theorem). Around $\lambda=1.5$ μm the resolution in nm is approximately $\delta\lambda=8$ ps/$\Delta\tau$.

Consequently, the maximum time delay is required to be significantly larger than the highest frequency component to produce a spectrum with useful resolution. For example, at a wavelength of $\lambda=1.5$ μm the corresponding period is $1/f\approx5$ fs, and a relative time delay between the optical signals of the arms may be $\Delta\tau=100$ fs, corresponding to 20/f. The formula given in the previous paragraph can be used to approximate the resolution to $\delta\lambda=80$ nm.

Preferably the interferometer is provided in a configuration that allows for the use of a single detector, combined with a tunability of the relative time delay between the optical signals propagating in the arms of the interferometer. This may allow for significantly more affordable Fourier-transform spectrometers than presently available, with a cost that may be significantly reduced.

Furthermore, the present interferometer may be operable over a large bandwidth, including the visible to the infrared spectrum, covering for example the fingerprint region (5-9 μm), which is important for applications in medtech, healthcare, biosciences, for production and more. The large bandwidth may in-part be attributed to the use of slot waveguides, which are, to a large degree, wavelength agnostic.

Preferably, at least part of the interferometer is suspended from a (surrounding) bulk material. The bulk material may be a material, such as electrical conductive material, on either side of an isolation trench. Thereby the suspended structures may be positioned within the isolation trench and suspended from the bulk material.

Relative Time Delay Induction

In one embodiment of the invention the control mechanism is configured to control the relative time delay to the optical signal in one or more interferometer arms. The control mechanism may be configured to induce the relative time delay to the optical signal in one or more of the interferometer arms. The control mechanism may thereby introduce a relative time delay between the optical signals propagating in the one or more interferometer arms. It is a preference that the interferometer is configured such that the optical signal is split into the at least two interferometer arms comprising one or more slot waveguides, such that an optical signal propagates in each interferometer arm. It is a further preference that the interferometer comprises a control mechanism configured for controlling a relative time delay between said optical signals propagating in the two or more interferometer arms, by modifying one or more slot widths, before rejoining the optical signals. For example, the slot widths of the slot waveguides of one of the interferometer arms may be controlled by the control mechanism while the slot widths of the slot waveguides of the one or more other interferometer arms may be constant. Alternatively, the interferometer may consist of two interferometer arms and the control mechanism may be configured such that the slot widths are inversely controlled. The control mechanism may consequently be configured such that the slot widths of one interferometer arm are increased upon decreasing the slot widths of the other interferometer arm, and decreased upon increasing the slot widths of the other interferometer arm.

In one embodiment of the present disclosure at least one slot waveguide is an electromechanically tunable slot waveguide.

In one embodiment of the present disclosure the control mechanism is configured to induce a relative time delay to the optical signal by modifying a slot width of one or more slot waveguides.

Preferably the control mechanism is configured to induce a relative time delay to the optical signal by modifying one or more slot widths of one or more slot waveguides. The slot width is given by the distance between the two strips of high refractive index materials, of the slot waveguide.

Depending on the compression of the photonic slot mode, given by said slot width, the resulting effective mode index may be modified. Consequently, a relative time delay between the optical signals propagating in the at least two arms of the interferometer may be introduced by modifying the slot width of said arms. Thereby, the relative time delay is not necessarily introduced by differences in path length between the arms of the interferometer, although this may additionally be a contributing factor to the relative time delay.

Therefore, in one embodiment of the present disclosure the control mechanism is configured to induce a relative time delay to the optical signal by modifying the effective mode index of one or more slot waveguides.

In one embodiment of the present disclosure said on-chip interferometer is configured to guide optical signals with a wavelength range between 1000 nm and 10 µm, more preferably between 1000 nm and 7 µm, even more preferably between 1200 nm and 5 µm, yet even more preferably between 1400 nm and 3 µm, yet more preferably between 1400 nm and 2000 nm, most preferably around 1550 nm.

In one embodiment of the present disclosure, the in-plane interferometer is optimized for operation in a wavelength range between 1000 nm and 10 µm, more preferably between 1000 nm and 7 µm, even more preferably between 1200 nm and 5 µm, yet even more preferably between 1400 nm and 3 µm, yet more preferably between 1400 nm and 2000 nm, most preferably around 1550 nm.

Consequently, the present on-chip interferometer may be operable over a large bandwidth, including the visible to the infrared spectrum, covering for example the fingerprint region (5-9 µm), which is important for applications in medtech, healthcare, biosciences, for production and more. The large bandwidth may be, in-part, attributed to the use of slot waveguides, as they are, to a large degree, wavelength agnostic.

NEMS Actuator

Several types of control mechanisms may be used for inducing the relative time delay in at least one of the interferometer arms. Preferably, the control mechanism comprises or consists of at least one electrically controlled actuator, such as an electromechanical actuator, configured for modifying the slot width of a slot waveguide, such as by displacement of one of the strips of said slot waveguide. Preferably the slot waveguide is a suspended slot waveguide. Therefore, the control mechanism may be provided in the form of one or more micro and/or nano actuators, such as nanoelectromechanical systems (NEMS) actuators and microelectromechanical systems (MEMS) actuators. These are devices, known to a person skilled in the art, that are typically capable of linear actuation in the micro- and nanometer scale, and commonly used in nanoelectromechanical devices. They may for example be based on the use of electrostatic charges, or magnetism, for inducing a force between parts of the device, acting to actuate the device. However, other physical effects may be used to induce an actuation, such as temperature variations.

In one embodiment of the present disclosure, the control mechanism comprises one or more electromechanical actuators and/or electromechanically controlled actuators. Multiple electrically controlled actuators may be used, for example to control the slot width of two, or more, slot waveguides, wherein the slot waveguides may be on the same or separate arms, and may be individually controlled by separate actuators. Furthermore, the position of each strip of one or more waveguides, such as every slot waveguide, may be controlled by separate actuators. Thereby multiple actuators may control the same slot width.

In one embodiment of the present disclosure, the control mechanism therefore comprises a nanoelectromechanical systems (NEMS) actuator, configured for inducing the relative time delay in at least interferometer arm. The NEMS actuator may be a comb drive actuator, a parallel beams actuator a parallel plates actuator or any other suitable actuator. The actuator may be provided for example in the form of a push-pull type actuator, a push type actuator, a pull type actuator or a mixture thereof, such as by having multiple actuators in serial or parallel.

Multiple NEMS actuators may be used, for example to control the slot width of two, or more, slot waveguides, wherein the slot waveguides may be on the same or separate arms, and may be individually controlled by separate comb drive actuators. Furthermore, the position of each strip of one or more waveguides, such as every slot waveguide, may be controlled by separate NEMS actuators. Thereby multiple NEMS actuators may be configured for controlling the same slot width.

One commonly used type of NEMS actuator is NEMS comb drive actuators. These are often used as linear actuators in NEMS devices and typically operate at the micro- or nanometer scale. The motion of comb drive actuators is controlled by the equilibrium of the electrostatic force and elastic force of the suspension system. Because the distance between the comb fingers is constant, capacitance changes linearly regarding the area of the plates that overlap during such movement.

Therefore, the control mechanism may comprise one or more electrically controlled actuators for modifying the slot widths. The slot width may be static in one of the arms of the interferometer while a second arm may be tuned by said actuators, for introducing a relative time delay between the optical signals of the arms. The electrically controlled actuators may be any type of actuator providing sufficient control of the slot width. For example, the actuator may be a nanoelectromechanical systems (NEMS) comb drive, wherein the displacement of the actuator may be due to electrostatic forces that act between two electrically conductive combs.

In one embodiment of the present disclosure, the one or more comb drive is selected from the list including push type comb drive actuators, pull type comb drive actuators and push-and-pull type comb drive actuators or a mixture thereof.

In one embodiment of the present disclosure the on-chip interferometer is configured to modulate the effective refractive index of the mode of the optical signals relative between two or more of the arms, such as by displacement of one or more strips by the comb drive actuators.

In one embodiment of the present disclosure the control mechanism is configured for displacing one or more strips of one or more slot waveguides up to at least 10 nm, such as up to at least 20 nm, such as up to at least 40 nm, such as up to at least 60 nm, such as up to at least 100 nm, such as up to at least 150 nm, such as up to at least 200 nm.

In one embodiment of the present disclosure the interferometer is configured for displacing one or more strips of one or more slot waveguides up to at least 10 nm, such as up to at least 20 nm, such as up to at least 40 nm, such as up to at least 60 nm, such as up to at least 100 nm, such as up to at least 150 nm, such as up to at least 200 nm.

In one embodiment of the present disclosure the interferometer and/or the control mechanism may therefore be configured for displacing one or more strips of one or more slot waveguide in the range from 0 nm up to at least 10 nm, more preferably from 0 nm, up to at least 20 nm, even more preferably from 0 nm up to at least 50 nm, yet even more preferably from 0 nm up to at least 100 nm.

The control mechanism may be configured to modify the slot width of one or more slot waveguides or any of the interferometer arms, for example by displacement of one or more strips of said slot waveguide(s), such that the photonic slot mode is compressed. Compression of the photonic slot mode may result in a modification of the effective mode index.

Time Delay

In one embodiment of the present disclosure, the on-chip interferometer is configured to induce a relative time delay of at least 1 fs, more preferably at least 5 fs, yet more preferably at least 10 fs, even more preferably at least 100 fs, yet even more preferably at least 500 fs, most preferably at least 1 ps, between the optical signals of the two or more arms.

In one embodiment of the present disclosure, the control mechanism is configured for inducing a relative time delay between the optical signals of the two or more arms of up to at least 1 fs, more preferably up to at least 5 fs, yet more preferably up to at least 10 fs, even more preferably up to at least 100 fs, yet even more preferably up to at least 500 fs, most preferably up to at least 1 ps.

In an embodiment of the present disclosure, the relative time delay induced by the interferometer is at least 1, more preferably at least 2, even more preferably at least 5, most preferably at least 10 optical periods of the longest optical wavelength of the optical signal. A longer relative time delay enables a higher resolution of the interferometer, therefore it is a strong preference that the on-chip interferometer of the present disclosure is configured such that it enables a longer relative time delay, as compared to interferometers, phase modulators and switches of the prior art.

As discussed elsewhere herein, optical signals of two or more arms, wherein the relative time delay is $\tau$, may result in an interfered (rejoined) optical signal wherein the intensity $I(\tau)$ is typically integrated over many periods, due to the frequency of the components of the optical signal with respect to the sampling frequency of a sensor, which directly corresponds to measuring $S(t)$ with $t=\tau$. A Fourier Transform of the measured signal produces the intensity of each frequency component present in the signal $I(f)$ with a resolution that scales with wavelength, and importantly, inversely with the maximum time delay, $\Delta\tau$ (bandwidth theorem). Around $\lambda=1.5$ μm the resolution in nm is approximately given by $\delta\lambda=8$ ps/$\Delta\tau$.

It may therefore be a requirement that the maximum time delay is significantly higher than the time delay of the highest frequency component in the optical signal, to produce a spectrum with useful resolution. For example, at a wavelength of $\lambda=1.5$ μm the corresponding period is $1/f\approx5$ fs, and a relative time delay between the optical signals of the arms may be $\Delta\tau=10$ fs, corresponding to $2/f$. The formula given in the previous paragraph can be used to approximate the resolution to $\delta\lambda=800$ nm. By the same logic, a relative time delay between the optical signals of the arms of $\Delta\tau=1$ ps, corresponding to $200/f$, would result in an approximate resolution of $\delta\lambda=8$ nm.

Therefore, in one embodiment of the present disclosure the on-chip interferometer/control mechanism, is configured to induce a time delay between 0 and 10 fs, more preferably a time delay between 0 and 100 fs, even more preferably a time delay between 0 and 1 ps, yet even more preferably a time delay between 0 and 10 ps, further more preferably a time delay between 0 and 50 ps, most preferably a time delay between 0 and 100 ps.

In one embodiment of the present disclosure, the on-chip interferometer is configured to induce a change in the effective mode index of the optical signal of one or more of the arms of at least 0.1, more preferably at least 0.2, even more preferably at least 0.5, most preferably at least 1.0.

In one embodiment of the present disclosure, the length of the slot waveguides are between 10 μm and 10 mm, more preferably between 100 μm and 5 mm, even more preferably between 500 μm and 2.5 mm, most preferably between 1 mm and 2 mm.

The slot waveguides may be of different lengths, and may therefore have differences in path lengths for the optical signal, that may result in a relative time delay to the optical signal, even though the effective index mode (the slot width) of the slot waveguides are identical.

In one embodiment of the present disclosure, the length of the sections of the slot waveguides, where the slot width is controlled by the control mechanism, of one or two or all interferometers arms are, each, at least 10 μm, more preferably at least 20 μm, even more preferably at least 50 μm, yet more preferably at least 100 μm, even more preferably at least 500 μm, yet even more preferably at least 1 mm, most preferably at least 3 mm. Said sections, of each interferometer arm, are preferably parts of the slot waveguides wherein the slot width is controlled by the control mechanism. A longer controllable section typically leads to a larger time delay.

Longer slot waveguides, result in general in an amplification of the change of the effective refractive index resulting in the displacement from changing the slot width resulting from minimal voltages. Thereby, actuation of longer slot waveguides may result in a larger time delay. A limiting factor for the length of the slot waveguides may be optical losses, which increases with increasing device length.

Suspension

In one embodiment of the present disclosure, the interferometer is, at least in part, a suspended structure, such as suspended by a suspension system. The suspension system may comprise of consists of a number of tethers and/or wires that contacts any part of the interferometer, for example the input waveguide, the output waveguide and the interferometer arms, such as the strips of one or more of the slot waveguides of one or more of the interferometer arms. The suspension system is preferably configured to suspend the interferometer, such as the interferometer arms. Preferably, the suspension system is configured to suspend one or more of the slot waveguides of the interferometer arms. The suspension system preferably comprises tethers configured to suspend the interferometer, or parts thereof, from one or more structures. A preferred embodiment of the presently disclosed on-chip interferometer employs one or more of the circuit crossings disclosed in PCT/EP2020/082545 to transfer electrical current to part of the interferometer. Here some tethers may act to conduct current, i.e. they are also wires. The mechanical tethers holding a slot waveguide may not conduct current as they can be on the same potential, while the potential difference occurs at the electromechanical actuator.

In a specific embodiment of the present disclosure, the slot waveguides of the one or more interferometer arms, or parts thereof, are suspended from the control mechanism. For example each strip of the slot waveguides of the interferometer arms may be suspended from the control mechanism. In an embodiment of the present disclosure, the one or more slot widths of the slot waveguides of the interferometer arms are modified by movement of the control mechanism. In a specific embodiment of the present disclosure, the strips of the slot waveguides of the interferometer arms are suspended from the control mechanism, such that movement of the control mechanism directly modifies the slot width.

The interferometer may be formed by etching of for example a silicon surface such that the slot waveguides are suspended in a trench. The trench may be surrounded by unetched material. In a particular embodiment of the present disclosure, the interferometer is, at least partly, suspended from bulk material, such as unetched material, such as of an etch trench. However, bulk material may comprise or consist of other material(s) than the interferometer. The bulk material may have been formed separately to forming the waveguide. The bulk material may be a planar structure. The bulk material may have a top surface that is substantially parallel to, and in the same height as, the top surface of the waveguide(s), such as the top surface of the bulk material that suspends the waveguide.

The bulk material may be provided in the same material as the interferometer, such as the waveguide(s). The bulk material may be the remnant of a layer from which, at least part of, the interferometer has been formed. Alternatively or additionally, bulk materials may be formed following, or prior to, formation of the interferometer, and may be provided in material other than the material(s) of the interferometer. The bulk material preferably surrounds at least part of the interferometer, and may form an electrical isolation trench.

In one embodiment of the present disclosure the tether(s)/wire(s) are configured to provide mechanical stability to the interferometer, such as by forming a suspension system. In a preferred embodiment wherein at least one of the waveguides are suspended, such as suspended in a fluid, such as gas, such as air, such as vacuum the tether(s)/wire(s) may form a suspension system that, at least partly, suspends said at least one optical waveguide.

In one embodiment of the present disclosure tether(s) and/or wire(s) are configured to provide a physical, and preferably also an electrical, connection between the interferometer, such as the waveguides, and the bulk material(s). Preferably the tether/wire and the waveguide is provided in an electrically conductive material. The tether(s)/wire(s) may be formed in the same material as the waveguide and/or the bulk material, or it may be formed in a separate material.

The suspension system may be provided as an in-plane chip-scale electrical connection. The suspension system may comprise or consist of a number of tethers and/or wires that physically, mechanically and/or structurally connect the waveguides, such as one or more strips of the slot waveguide of one or more interferometer arms, and bulk material next to said strips. Furthermore electrical isolation of parts of the interferometers may be incorporated by gaps between two or more conductive materials, such as two conductive waveguides. Conductive waveguides, that may provide an electrical connection, such as through wires, between the material positioned on both sides of the waveguide may therefore alternatively or additionally be electrically isolated from each other. For example two conductive waveguides may have an electrical isolation gap provided between them. The electrical isolation gap is preferably configured for transmission of the optical signal while it electrically isolates the two or more optical waveguides. Electrical isolation between two or more waveguides and in-plane chip-scale electro photonic crossing are additionally disclosed in the application entitled "In-plane chip-scale photonic device" submitted by the same applicant and pending as PCT/EP2020/082545.

Materials

In one embodiment of the present disclosure, the slot waveguides comprise strips of high-refractive-index materials separated by a subwavelength-scale low-refractive-index material slot region.

In one embodiment of the present disclosure, the high refractive index material has a refractive index between 1.1 and 4.0, such as between 1.5 and 4.0, such as between 2.5 and 4.0, such as between 3.25 and 3.75, such as between 3.4 and 3.6.

In one embodiment of the present disclosure, the low refractive index material has a refractive index between 1.0 and 3, more preferably between 1.0 and 1.5, most preferably between 1.0 and 1.1.

It should be noted that polymers in general have indices around 1.5, while several semiconductors (such as silicon, InP, GaAs) have an index of 3.0-3.6. Specifically silicon is around 3.5.

In one embodiment of the present disclosure, said interferometer consists of or comprises a conductive material.

In one embodiment of the present disclosure, said interferometer consists of or comprises a material selected from the list including silicon, indium phosphide, gallium arsenide, silicon carbide, silicon nitride, aluminum gallium arsenide, silicon oxide, silicon oxynitride, gallium nitride or combinations thereof, such as mixes, alloys, or digital alloys, wherein the material further may be doped (intentionally or unintentionally). In that regard it is noted that silicon can be electrically conducting and the conductivity depends on doping, where high doping leads to low resistances but also higher optical loss. The presently disclosed interferometer advantageously works even when using silicon with very low background doping.

In one embodiment of the present disclosure, said interferometer is provided on at least one insulator, such as wherein the at least one insulator is selected from the list including air, vacuum, silicon dioxide, silicon oxides, alumina, titania, hafnia, polymers, ceramics, and any combination thereof. The presently disclosed interferometer may for example be configured that the fixed/anchor parts are arranged on a solid insulator and the suspended parts on air/vacuum/gas.

In one embodiment of the present disclosure, said interferometer has been fabricated by micro- and nanolithography methods selected from the list including electron-beam lithography, Ion-beam lithography, ion-beam milling, Laser-cutting, nano-imprint lithography, ultraviolet lithography, deep-ultraviolet lithography, extreme ultraviolet lithography, proton-beam lithography, nanoscribe, X-ray lithography, (Talbot) interference lithography, magnetolithography, scanning-probe lithography or neutral-particle lithography, such as 3D printing.

Control

In one embodiment of the present disclosure, the control mechanism is configured to displace the one or more strip(s) independently of the displacement of other strips, such as the other strip of the same slot waveguide, and/or one or more strips of other slot waveguides. The position of one or more strips may consequently be individually controlled by control mechanisms, such as a comb drive actuator, wherein each strip may be controlled by an individual control mechanisms. Multiple control mechanisms may be used to control the same strip, for example positioned in serial, such that the lateral position of one section of the strip is controlled by one controlled mechanism while other sections of the same strip may be controlled by secondary, tertiary, quaternary, quinary, and so on, control mechanisms.

In an embodiment of the present disclosure, the control mechanism is configured to control one or more strips or one or more interferometer arms, such as control the position. In a specific embodiment of the present disclosure, the control mechanism is configured to control, such as control the position of, one or more strips of one or more interferometer arms for a control length. In an embodiment of the present disclosure, the control length is a continuous length wherein the waveguide, such as the slot waveguide and/or the strip(s) of a slot waveguide is suspended. For example, for an interferometer comprising a control mechanism configured to control the slot width of a slot waveguide of one or more interferometer arms, the slot widths of said slot waveguides may each be controlled for a respective control length. Slot waveguides suspended from a control mechanism enable long control lengths, as compared to slot waveguides that are not suspended from a control mechanism. It should be noted that an interferometer arm may comprise multiple suspended portions, and wherein the control mechanism controls the slot width of multiple of said portions. In such a case, the total control length is the sum of the control length of each suspended portion where the control mechanism controls the slot width. Thereby, the total control length may be larger than the control length, for an interferometer arm. In an embodiment of the present disclosure, one or more, such as all, of the interferometer arms comprise one or more suspended portions wherein the control mechanism is configured to control the slot width, and wherein the length of said portion is above 6 μm. The control length may thereby be above 6 μm. In another embodiment of the present disclosure, the control length of one or more of the slot waveguides of one or more of the interferometer arms is at least 8 μm, more preferably at least 10 μm, yet more preferably at least 20 μm, yet even more preferably at least 30 μm, further yet even more preferably at least 50 μm, most preferably at least 100 μm.

It should be noted that the interferometer may comprise more than two arms, for example four arms, or five, six, seven or eight arms. An interferometer comprising four arms, wherein each arm comprises one slot waveguide, thereby, has at least four slot waveguides. They can be arranged in parallel or in series, e.g. for cascading the delay. An interferometer comprising more arms than two, may comprise additional splitters, e.g. beam splitters, power splitters or signal splitters, active or passive, for splitting the optical signal. A first splitter may be used to split the input waveguide to two subsequent waveguides, where both of these subsequent waveguides may comprise a splitter for splitting the optical signal into, for example, four arms of the waveguide. Following propagation of the optical signal through the arms, the optical signal is rejoined.

In one embodiment of the present disclosure, one or more arms of the interferometer may comprise one or more slot waveguides. Consequently, an interferometer may comprise for example two arms, wherein both arms comprise two slot waveguides.

In one embodiment of the present disclosure the slot waveguides are not necessarily required to be positioned in serial, but instead may be positioned in parallel. As a result, the two arms of the interferometer comprise two sub arms, totaling four arms in parallel. In the general sense it should be noted that the two or more arms of the interferometer may, in turn, comprise any number of sub arms. The sub arms comprise waveguides, such as slot waveguides, suitable for propagation of the optical signal that has been split at least twice. The sub arms may be of different lengths, and the slot widths of the slot waveguides of the sub arms may be individually controlled. The sub arms may be used for targeting different wavelength ranges.

An interferometer wherein the arms comprise further sub arms may result in a worse signal-to-noise ratio and longer data acquisition time, however the interferometer may be more versatile and compact, which are often desirable for integrated devices.

A Spectrometer

The present disclosure further relates to a Fourier transform spectrometer comprising: an on-chip interferometer as disclosed herein; a detector configured for measuring the recombined optical signal; and a processing unit configured for spectral analysis of the measured recombined optical signal. In that regard the presently disclosed on-chip interferometer may be combined with a light-source to produce a pre-dispersive signal, i.e. emitted from the on-chip interferometer to interact with a sample of interest. The signal therefrom can then be detected and analysed. Alternatively a post-dispersive configuration can be provided if a light source initially is incident on a sample, then into the presently disclosed on-chip interferometer for subsequent detection and analysis. Packaging may be provided as a housing for the interferometer, the detector and the processing unit.

In one embodiment of the present disclosure the wavelength resolution is less than $\lambda/10$, such as $\lambda/20$, such as $\lambda/50$, such as $\lambda/100$, such as $\lambda/500$, such as $\lambda/1000$, such as $\lambda/5000$, such as $\lambda/10000$, such as $\lambda/50000$, such as $\lambda/100000$, where $\lambda$ is the free-space wavelength of light.

DETAILED DESCRIPTION OF DRAWINGS

The invention will in the following be described in greater detail with reference to the accompanying drawings. The drawings are exemplary and are intended to illustrate some of the features of the presently disclosed interferometer, and are not to be construed as limiting to the presently disclosed invention.

Figure 1:
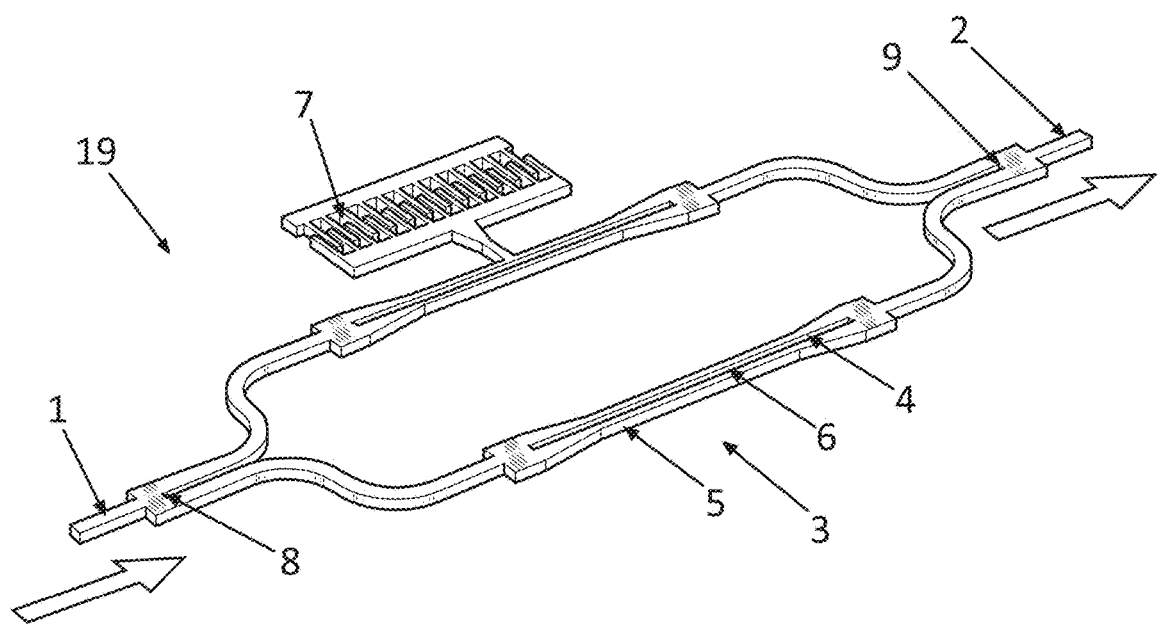
FIG. 1 shows a schematic illustration of a nanoelectromechanically actuated interferometer.

FIG. 1 shows a schematic illustration of a planar chip-scale nanoelectromechanically actuated on-chip interferometer (19) that uses a combination of slot waveguides, whose effective mode index is strongly dependent on the slot width, and nanoelectromechanical (NEMS) actuation. The principle builds on the well-known Fourier-transform spectrometer concept: An optical signal is split (8) into two, or more, arms (3) in which the speed of light (specifically the group velocity) can be varied. This causes an interference at the output of the spectrometer (2). By recording the transmitted intensity as a function of the relative time-delay difference between the two, or more, arms, an interferogram is obtained, which, after a Fourier transform, yields the spectrum.

A NEMS actuator (7) in the form of a NEMS comb drive can be seen connected to a strip (5) of one of the slot waveguides (4), wherein actuation results in the modification of the slot width (6). As discussed elsewhere herein, the interferometer may comprise multiple NEMS comb drives, for example one for controlling each slot waveguide (4), or one for controlling each strip of each slot waveguide. It can further be noted that the interferometer may comprise more than two arms, such as four arms in parallel. Wherein each arm, or pair of arms of different lengths, targets a specific wavelength range.

Figure 2A:
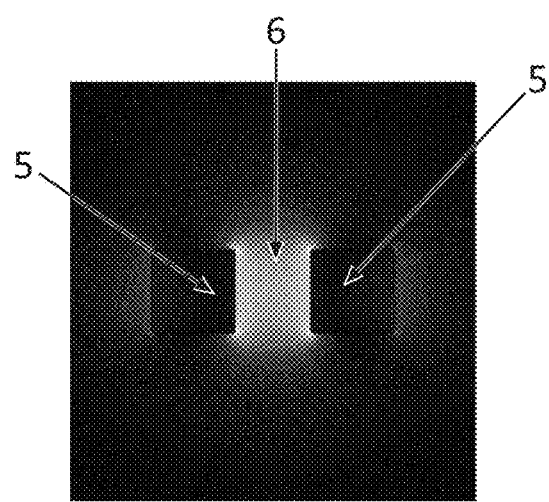
FIG. 2A shows the photonic slot mode at a slot width of 200 nm.
Figure 2B:
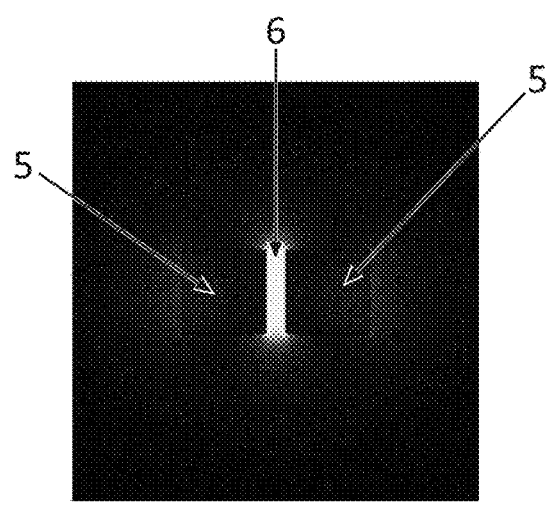
FIG. 2B shows the photonic slot mode at a slot width of 50 nm.

FIG. 2 shows the calculated transverse electric field profile visualizing the compression of the photonic slot mode at a slot width of 200 nm (FIG. 2A) and at 50 nm (FIG. 2B).

Figure 3:
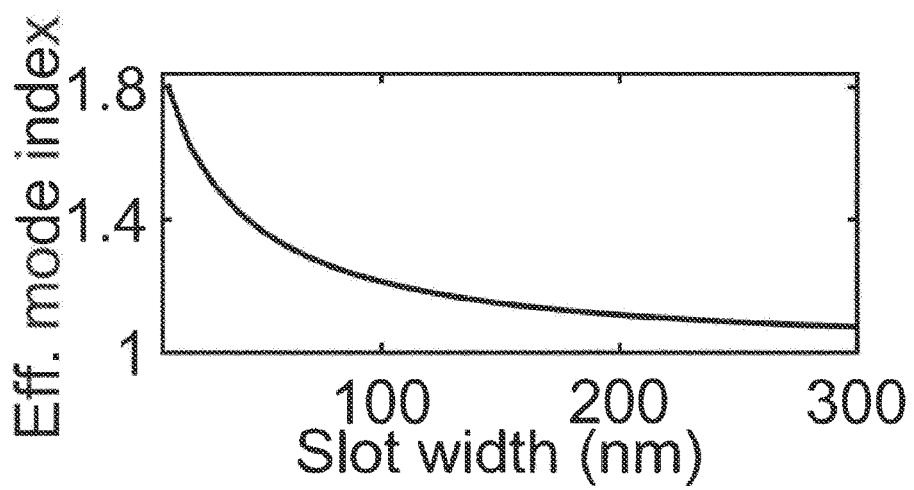
FIG. 3 shows the effective mode index as a function of the slot width.

FIG. 3 shows the calculated effective mode index as a function of the slot width (6). As can be seen, a strong confinement of the photonic slot mode results in a significant increase of the effective mode index, whereby the induced relative time delay may be increased, and the spectral resolution of a spectrometer would increase.

Figure 4A:
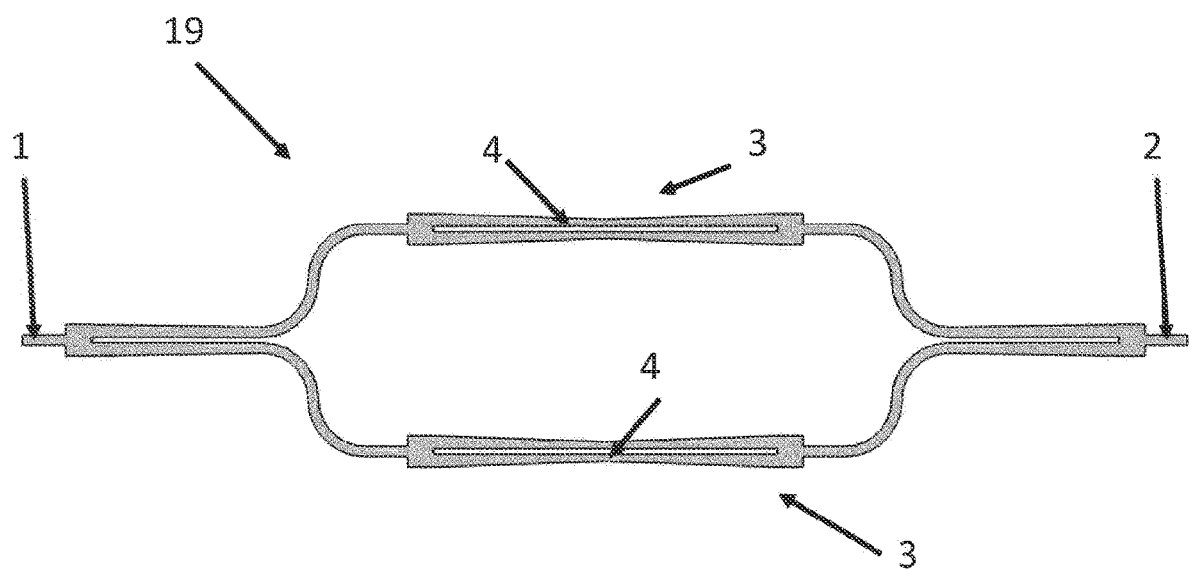
FIG. 4A shows a Mach-Zehnder interferometer comprising two arms, each comprising a slot mode waveguide.
Figure 4B:
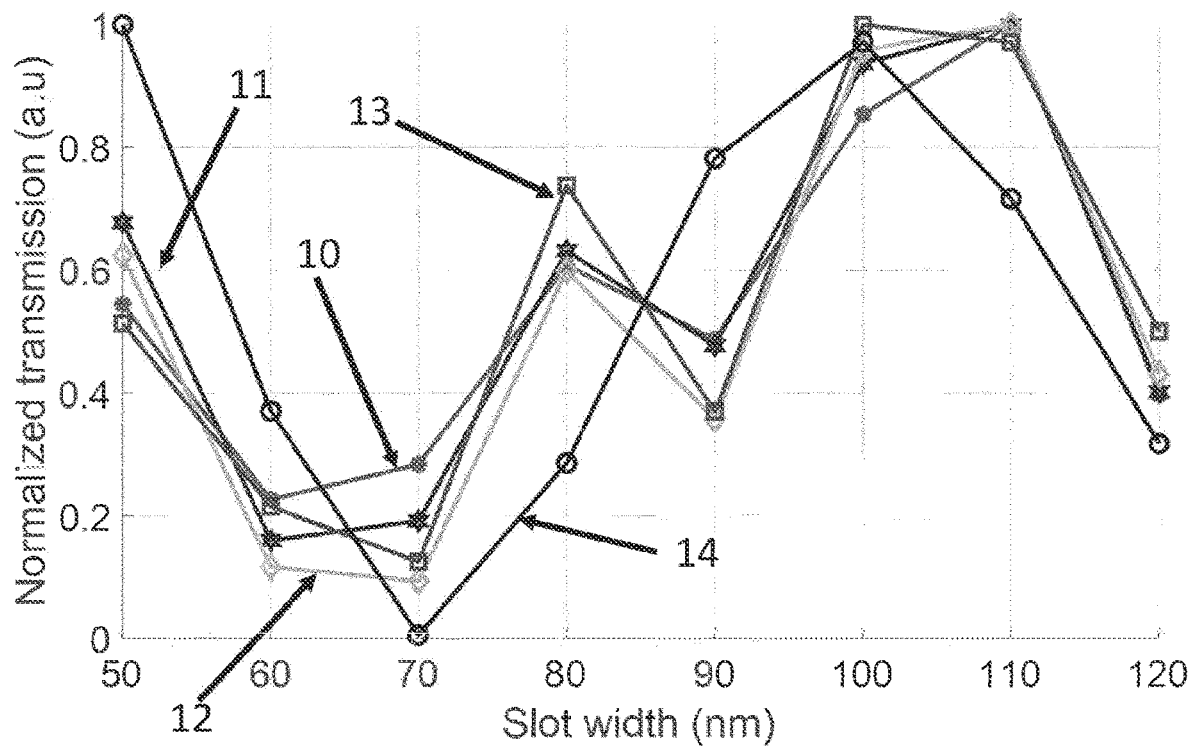
FIG. 4B shows measured and simulated transmission of the Mach-Zehnder interferometer as a function of the slot width of the lower arm.

FIG. 4A shows a Mach-Zehnder interferometer (19) (MZI) comprising an input waveguide (1) that is split into two arms (3), comprising slot mode waveguides, that is thereafter rejoined into an output waveguide (2). For demonstration of the principle of Fourier Transform Spectroscopy, 24 passive MZIs were fabricated in silicon, with a refractive index of n=3.48 at wavelength 2=1550 nm, separated by a slot width (6). FIG. 4B shows simulations and experimental measurements for eight devices wherein the slot waveguide (4) of one or the arms (3) had a constant slot width of 100 nm, while the slot width of the slot waveguide of the other arm varied between the fabricated devices between 50 and 120 nm in steps of 10 nm. For the experimental data, the wavelengths are 1430 nm (pink), 1470 nm (blue), 1510 nm (green), 1550 nm (red). For the calculated values, the wavelength is 1550 nm (black). As can be seen in the graph, the effective index of the slot mode, and thus, the relative time delay T of each arm, depends strongly on the gap. Consequently, the transmission intensity for different frequencies I(f) can be modulated. For short delays, the transmission $I(\lambda)=0$ whenever the phase $\phi(\lambda)=mod(\tau*f,\lambda)=mod(\tau*c/\lambda,\pi)=0$, where c is the speed of light and mod is modulus. In this case, the device generates an output signal that is similar to a passive switch, with a phase shift comparable to 0.5/f.

When a signal (either one wavelength or a broadband spectrum) with time-dependent intensity S(t) (such as an optical signal) is delayed by T and interfered, the intensity $I(\tau)$ integrated over many periods (typically at least a few hundred) directly corresponds to measuring S(t) with t=τ. This is advantageous whenever S(t) varies faster than a detector can detect, as detection must be at least twice as fast as the highest frequency component in the signal, cf. the sampling theorem. For example, for $\lambda=1.5$ μm (f≈193 THz), sampling should be performed at least every 2.5 fs (400 THz)).

The Fourier Transform (FT) of $S(t)=I(\tau)$ produces the intensity of each frequency component present in the signal I(f) with a resolution that scales with wavelength, and critically, inversely with the maximum time delay, Δτ (bandwidth theorem). Around $\lambda=1.5$ μm the resolution in nm is approx. $\delta\lambda=8$ ps/Δτ.

Therefore, Δτ>>1/f to produce a spectrum with a useful resolution (e.g. at $\lambda=1.5$ μm, 1/f≈5 fs, and Δτ=100 fs=20/f gives a resolution of $\delta\lambda=80$ nm).

As a consequence, it is the relative time delay difference T to the true time t which matters. The mod-function defies this equivalency as opposed to the switching case, since the total intensity (rather than at any one frequency where the phase may be computed) is now measured and integrated over many periods.

Figure 5:
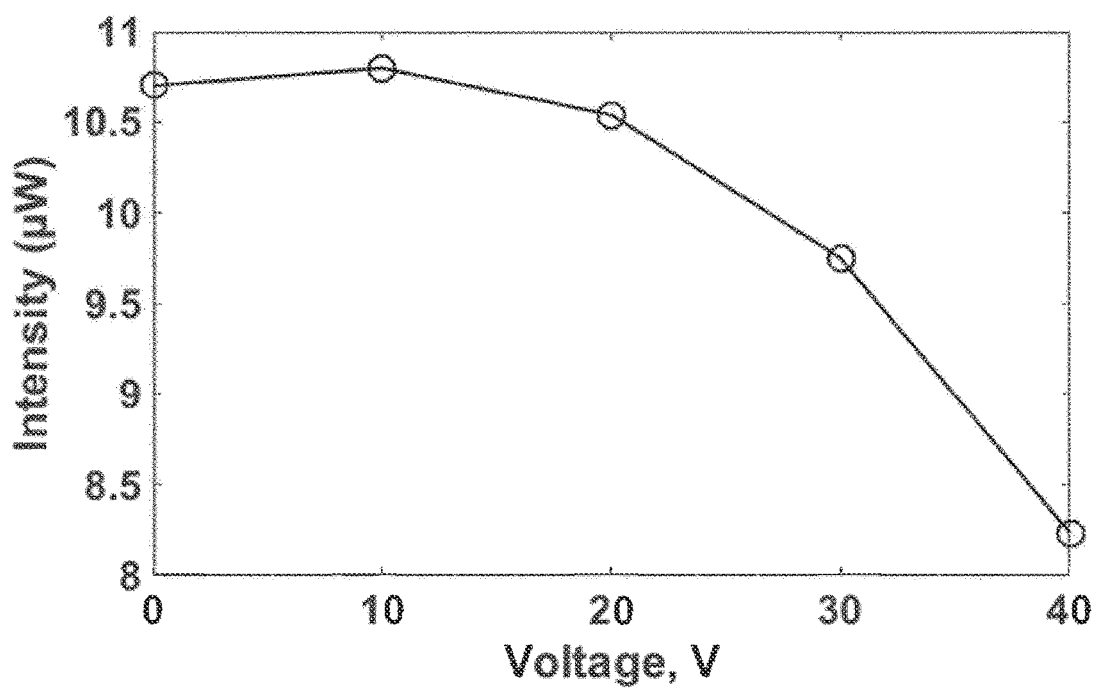
FIG. 5 shows output power of the Mach-Zehnder interferometer as a function of the applied voltage to the comb drive actuators.

FIG. 5 shows measured output power of the Mach-Zehnder interferometer as a function of the applied voltage to the comb drive actuators. A chip-scale in-plane MZI comprising long slot-mode waveguides in each arm was fabricated. The initial slot width is 200 nm, and can be reduced by applying a potential (V) difference across the comb drive actuators.

The device is capable of measuring many different time delays to produce a high-resolution spectrum with only one input-coupling and one output detector and proves that the Fourier Transform Spectrometer can be realized by a single nano-opto-electro-mechanical system, on a mass scalable, high-yield silicon-on-insulator fabrication platform. This leads to a dramatic reduction in footprint, time, and price required to obtain a spectrum, as compared to conventional spectrometers.

Figure 6A:
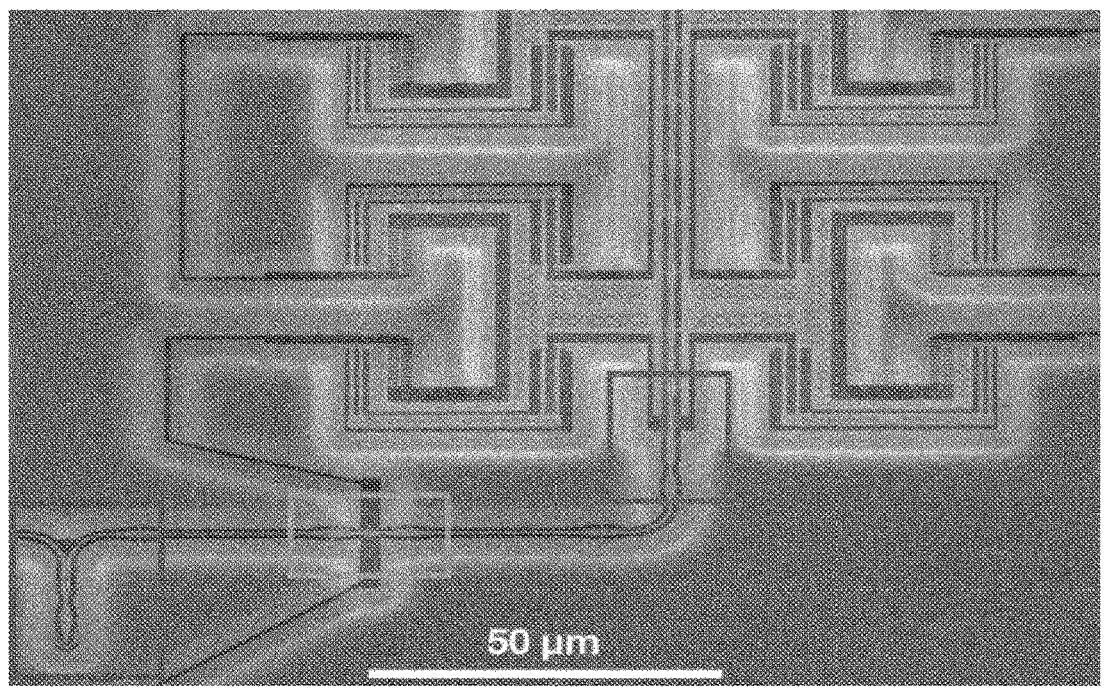
Figure 6B:
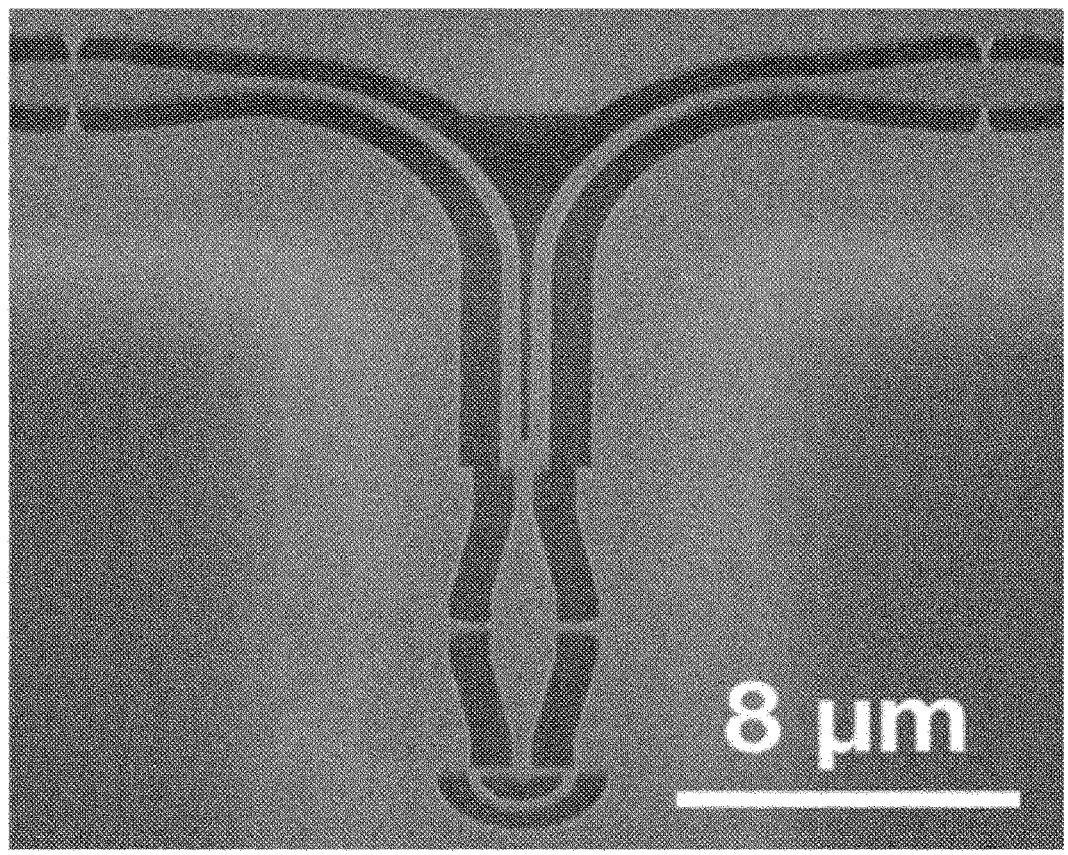
Figure 6C:
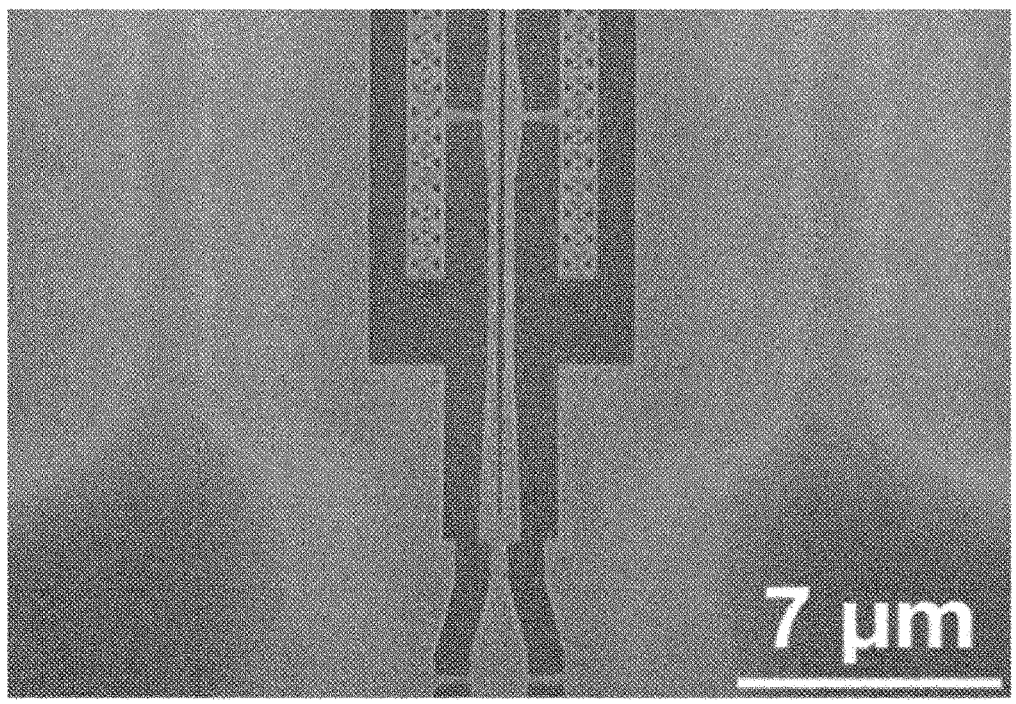
Figure 6D:
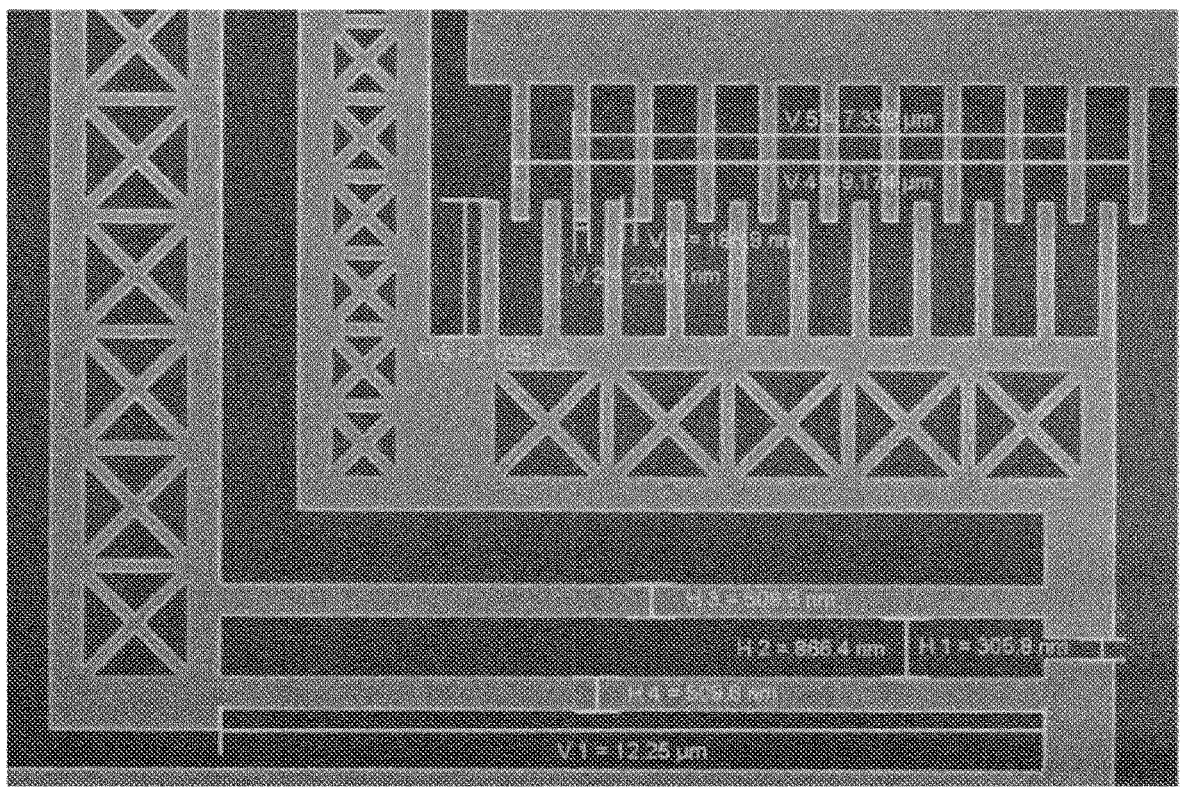

FIG. 6A-D show scanning electron micrographs of a suspended Mach-Zehnder interferometer actuated by nano-electromechanical comb drives (FIG. 6A). FIG. 6B is a magnification of the red rectangle in FIG. 6A and shows how an input waveguide is split into the two arms of the interferometer. Both arms lead to a mode converter for converting between the strip waveguide to the slot waveguide as can be seen in FIG. 6C. This figure further shows the contacting wires between comb drives and the strips of the slot waveguide. The slot waveguide is here contacted on both sides by comb drive actuators, that thereby control the position of each strip of the slot waveguide, and as a consequence the slot width of the slot waveguide is jointly controlled by the comb drive actuators. The comb drive actuators can further be seen in FIG. 6D. They are controlled by the equilibrium of the electrostatic force and elastic force of the suspension system. Since the distance between the comb fingers is constant, capacitance changes linearly with regard to the area of the plates that overlap during such movement.

The interferometer can for example be positioned within an isolation trench for isolation of parts of the integrated electro photonic device. In order to electrically isolate sections of the interferometer, it may comprise electrically isolating gaps, wherein the optical signal can be transmitted across said gap while providing sufficient electrical resistance, such that it thereby substantially provides electrical isolation at relevant voltages.

As known to a person skilled in the art, comb drives require specific voltages for their functioning. Where required, in order to ensure that the required voltage can be delivered to the specific sections of the device, a contact is formed between the waveguide and the surrounding bulk material by wires/tethers or wire bonding. The wires may be formed in an silicon and/or an electrically conductive material, if voltages are required to be delivered to, for example, the comb drives. In other instances, the wires may function as a suspension system, acting to suspend the interferometer from the surrounding bulk material.

FIG. 7 shows calculated values of displacement of the comb drive actuators of one arm of an active Mach-Zehnder interferometer as the function of the applied voltage to said comb drive actuator.

FIG. 8 shows the calculated resolution of a spectrometer comprising an on-chip interferometer, as a function of the comb drive actuator displacement. Wherein the resolution is given by $\delta\lambda=\lambda_0^2/(2\Delta nL)$, wherein the width of the strip of the slot waveguide is 240 nm and the height of the waveguide is 250 nm. The lengths of the slot waveguides are 65 μm (15), 130 μm (16), 260 μm (17) and 520 μm (18) respectively.

FIG. 9 shows the calculated resolution of a spectrometer comprising an on-chip interferometer, as a function of the slot width (slot gap). Wherein the resolution is given by $\delta\lambda=\lambda_0^2/(2\Delta nL)$, wherein the width of the strip of the slot waveguide is 240 nm and the height of the waveguides are 250 nm. The lengths of the slot waveguide is 65 μm (15), 130 μm (16), 260 μm (17) and 520 μm (18) respectively.

FIG. 10 shows the calculated resolution of a spectrometer comprising an on-chip interferometer, as a function of the maximum change in effective refractive index. Wherein the resolution is given by $\delta\lambda=\lambda_0^2/(2\Delta nL)$, wherein the width of the strip of the slot waveguide is 240 nm and the height of the waveguide is 250 nm. The lengths of the slot waveguides are 65 μm (15), 130 μm (16), 260 μm (17) and 520 μm (18) respectively.

FIG. 11 shows experimental data obtained during use of an interferometer according to an embodiment of the present disclosure, similar to the interferometer shown in FIG. 1. FIG. 11A shows raw intensities in arbitrary units measured against the voltage (V) applied. It can be seen that the intensity of the light varies with the applied voltage, due to the relative time delay between the optical signals of the two interferometer arms. The corresponding true time delay is shown in FIG. 11C, with the intensity plotted against the corresponding true time delay in femtoseconds. FIG. 11D shows a Fourier transform of the measurement data of FIG. 11C, shown as the relative spectral amplitude against the frequency in terahertz. A line is shown at 200 THz indicating the frequency of the laser light used in the experiment (Santee TLS-710). The obtained resolution, 1/Δt, at Δt≈15 fs (max value in bottom-left panel), is 66.7 THz, as shown in FIG. 11B, where the spectrum is shown with the x-axis in wavelengths (μm).

The invention claimed is:

1. An on-chip interferometer comprising;
a waveguide for propagation of an optical signal comprising
an input waveguide;
at least two interferometer arms comprising one or more slot waveguides; and
an output waveguide;
wherein the input waveguide is split into the interferometer arms which are recombined into the output waveguide; and
a control mechanism configured for controlling a relative time delay between optical signals propagating in the two interferometer arms by modifying one or more slot widths of one or more of the slot waveguides; and
wherein the relative time delay is at least 5 fs or at least one optical period of the longest optical wavelength of the optical signal.

2. The on-chip interferometer according to claim 1, wherein the relative time delay is at least 10 fs, or at least 100 fs, or at least 500 fs, or at least 1 ps, between the optical signals of the arms.

3. The on-chip interferometer according to claim 1, wherein the relative time delay corresponds to at least 1, or 2, or 5 or 10 or more optical periods of the longest optical wavelength of the optical signal.

4. The on-chip interferometer according to claim 1, wherein the control mechanism is configured for controlling a slot width of a suspended portion of the one or more slot waveguides, over a control length of at least 10 μm, or at least 20 μm.

5. The on-chip interferometer according to claim 1, wherein the one or more interferometer arms comprise one or more suspended portions with a length of at least 10 μm.

6. The on-chip interferometer according to claim 1, wherein the one or more slot waveguides are suspended from the control mechanism and wherein movement of the control mechanism modifies the slot width.

7. The on-chip interferometer according to claim 1, wherein any of the one or more slot waveguides comprise at least one suspended portion with a length of at least 10 μm, or at least 20 μm.

8. The on-chip interferometer according to claim 1, wherein the input and/or the output waveguide is suspended by one or more tethers and/or wires from a bulk material.

9. The on-chip interferometer according to claim 1, wherein the interferometer arms are contacted by one or more tethers and/or wires, and wherein all of said tethers/wires contact the interferometer arms along a contact length that is shorter than the shortest wavelength of the optical signal or along a contact length that is shorter than 1550 nm or 500 nm.

10. The on-chip interferometer according to claim 1, wherein the control mechanism comprises or consists of an electromechanical actuator, which is configured for controlling one or more slot widths of one or more slot waveguides.

11. The on-chip interferometer according to claim 1, wherein the control mechanism is configured to control a relative time delay to the optical signal by modifying the effective mode index of one or more slot waveguides.

12. The on-chip interferometer according to claim 1, wherein each slot waveguide comprises two strips and wherein the slot width is defined by the distance between said strips.

13. The on-chip interferometer according to claim 1, configured to guide optical signals with a wavelength range between 1400 nm and 2000 nm.

14. The on-chip interferometer according to claim 1, wherein the control mechanism comprises or consists of one or more nanoelectromechanical (NEMS) comb drive actuators.

15. The on-chip interferometer according to claim 1, wherein the control mechanism is configured to control or induce a relative time delay to the optical signal by modifying the speed of light propagating in one or more slot waveguides.

16. The on-chip interferometer according to claim 1, wherein the at least one comb drive actuator is selected from the list including push type comb drive actuators, pull type comb drive actuators, and push-and-pull type comb drive actuators or a mixture thereof.

17. The on-chip interferometer according to claim 1, configured to induce a change in the effective mode index of at least 0.5, or at least 1.0.

18. The on-chip interferometer according to claim 1, wherein the slot waveguides comprise strips of high-refractive-index materials separated by a subwavelength-scale low-refractive-index material slot region.

19. The on-chip interferometer according to claim 1, wherein said interferometer is provided on an insulator, wherein the insulator is selected from the list including air, vacuum, silicon dioxide, silicon oxides, alumina, titania, hafnia, polymers, and ceramics.

20. A Fourier transform spectrometer comprising:
an on-chip interferometer comprising;
a waveguide for propagation of an optical signal comprising
an input waveguide;
at least two interferometer arms comprising one or more slot waveguides; and
an output waveguide;
wherein the input waveguide is split into the two interferometer arms which are recombined into the output waveguide; and
a control mechanism configured for controlling a relative time delay between optical signals propagating in the two interferometer arms by modifying one or more slot widths of one or more of the slot waveguides; and wherein the relative time delay is at least 5 fs;
a detector configured for measuring the recombined optical signal; and a processing unit configured for spectral analysis of the measured recombined optical signal.

21. The Fourier transform spectrometer according to claim 20, wherein the wavelength resolution is less than $\lambda/5000$, where $\lambda$ is the free-space wavelength of light.

* * * * *